United States Patent [19]
Hardesty

[11] Patent Number: 6,005,513
[45] Date of Patent: Dec. 21, 1999

[54] PORTABLE FLIGHT GUIDANCE AND TRACKING SYSTEM

[75] Inventor: W. Mark Hardesty, Chandler, Ariz.

[73] Assignee: McDonnell Douglas Helicopter Company, Mesa, Ariz.

[21] Appl. No.: 08/868,203

[22] Filed: Jun. 3, 1997

Related U.S. Application Data

[60] Provisional application No. 60/018,877, Jun. 3, 1996.

[51] Int. Cl.$^6$ .............................. H04B 7/185; G01S 5/02
[52] U.S. Cl. ............................... 342/357.09; 342/357.13; 701/213
[58] Field of Search .................... 342/357.09, 357.13; 701/213, 215

[56] References Cited

U.S. PATENT DOCUMENTS

| | | |
|---|---|---|
| 5,311,194 | 5/1994 | Brown . |
| 5,522,567 | 6/1996 | Kinstler . |
| 5,610,616 | 3/1997 | Vallot et al. . |
| 5,714,948 | 2/1998 | Farmakis et al. . |
| 5,904,724 | 5/1999 | Margolin . |

*Primary Examiner*—Theodore M. Blum
*Attorney, Agent, or Firm*—Stout, Uxa, Buyan & Mullins, LLP; Donald E. Stout

[57] ABSTRACT

A portable three-dimensional position and velocity data archiving system for use with an aircraft during flight testing and evaluations. The system includes a ground based system and an airborne system. Each system includes a GPS receiver electrically connected with a GPS antenna for receiving and interpreting GPS signals transmitted from a GPS satellite constellation. Each system also includes a radio communication device for transferring position and velocity data as well as error correction data and guidance cues between the ground and airborne systems. The portable system acquires, processes, archives, and provides precise three-dimensional position and velocity data for the aircraft in real time. Information regarding aircraft position, direction, velocity, acceleration and any correction needs referenced to a selected coordinate system is immediately presented to a vehicle piloting crew on analog as well as digital indicators.

23 Claims, 7 Drawing Sheets

```
SELECT TEST TYPE                    ─66

1.  CATEGORY "A"
2.  FAR 36 - "H" NOISE
3.  FAR 36 - "J" NOISE
4.  ADS 33 - C MANEUVERS
5.  PILOT SKILLS TEST               ─70
6.  TEST RANGE SURVEY
7.  LEVEL AIRSPEED CALIBRATION
8.  UP & AWAY AIRSPEED CALIBRATION
9.  ALTIMETRY ERROR
10. SYSTEM PERFORMANCE              ─68
11. CATEGORY "A" TRAINING
```

Fig. 4a

```
                                 66)  70)
SELECT TEST RANGE

1.  MDHS FLIGHT RAMP
2.  ESTRELLA SAILPORT
3.  COOLIDGE AIRPORT
4.  FLAGSTAFF AIRPORT
5.  HOUSTON RIG PLATFORM
6.  LONG BEACH RIG PLATFORM
7.  FAIRBANKS PLATFORM
8.  WILLIAMS GATEWAY NORTH RUNWAY
9.  USER DEFINED
                                      68
```

Fig. 4b

```
"TO" WAYPOINT OFFSET    ─68

1.  20 KILOMETERS
2.  10 KILOMETERS
3.  5 KILOMETERS
4.  1 KILOMETER
5.  0 KILOMETERS        ─70
                66
```

Fig. 4c

```
                          66)
           68─ RADIO T/R FREQUENCY 1.  464.500 Mhz
           70─2.  464.550 Mhz
              3.  469.500 Mhz
              4.  469.550 Mhz
              5.  OTHER
```

Fig. 4d

DATA TM FREQUENCY 1. 4 Hz
2. 2 Hz
3. 1 Hz
4. 0.5 Hz
5. NO TM
6. OTHER

Fig. 4e

CATEGORY A TESTING

TAKEOFF / LANDING
MAGNETIC HEADING
TWIN / SINGLE
ENGINE
DATA ON / OFF

Fig. 4f

FAR 36 - "H" NOISE

OUTSIDE AIR TEMP
REF TRUE AIRSPEED
PRESS ALTITUDE
TYPE PROFILE - TAKEOFF / LANDING / LEVEL
MAGNETIC HEADING
INDICATED AIRSPEED TO FLY
CDI / GDI ACTIVE
DATA ON / OFF

Fig. 4g

FAR 36 - "J" NOISE

MAGNETIC HEADING
REF TRUE AIRSPEED
OUTSIDE AIR TEMPERATURE
PRESSURE ALTITUDE
INDICATED AIRSPEED TO
CDI / GDI ACTIVE
DATA ON / OFF

Fig. 4h

ADS 33 - C MANEUVERS

TO BE
DETERMINED

Fig. 4i

PILOT SKILLS TEST

TURN ROTOR ON POINT
TURN TAIL ON POINT
TURN NOSE ON ARC
TURN TAIL ON ARC
ROTOR ON SQUARE BOX
POP UP (SLOW - RAPID)
DUCK (SLOW - RAPID)
CONSTANT ALTITUDE RAPID ACCEL / QUICK STOP
ROTOR TIP DISTANCE TO OBSTACLE
DATA ON / OFF

Fig. 4j

TEST RANGE

WAYPOINT #
SAMPLE RATE
AVERAGES
INSTANTANEOUS
AVERAGE POSITION
DATA ON / OFF

Fig. 4k

LEVEL AIRSPEED CALIBRATION

OUTSIDE AIR TEMP
PRESSURE ALTITUDE
MAGNETIC HEADING
INDICATED AIRSPEED
INDICATOR ERROR
TRUE AIRSPEED
GROUND SPEED
AIRMASS SPEED / DIRECTION
POSITION ERROR
GDI ACTIVE
DATA ON / OFF

PORTABLE FLIGHT GUIDANCE AND TRACKING SYSTEM

CROSS REFERENCE TO RELATED APPLICATIONS

This application claims the benefit of U.S. Provisional Application No. 60/018,877, filed Jun. 3, 1996, and entitled *Portable Flight Test Guidance and Tracking system.*

FIELD OF THE INVENTION

This invention relates generally to three dimensional positioning and tracking systems for aircraft and more particularly, to a portable flight guidance and tracking system having real time guidance feedback and archiving capabilities.

BACKGROUND OF THE INVENTION

Three dimensional positioning systems are commonly used when testing an aircraft to meet certain flight requirements as well as for certain flight and noise certifications. These positioning systems provide information and data regarding the aircraft position relative to other locations and factors during the test. Some of these other factors may include aircraft velocity, acceleration and orientation.

Flight tests and certification requirements may be made internally by the developer or purchaser of the aircraft, or required by governmental agencies such as those of the Federal Aviation Administration or the military. These tests and certification requirements are often custom flight tests, being specifically configured for the aircraft being evaluated, the test being performed, and the location or range of the test, among other factors.

The flight test applicant is typically required to show certain flight profile data in three-dimensional space. This data may include height above ground and distance from take-off point and/or the point in space at which a simulated engine failure occurs. In addition to the flight profile height and distance data, airspeed (velocity), rate of climb, engine power and take-off weight, among others must also be documented. Other test requirements may also be necessary. For example, the Federal Aviation Administration places strict wind limitations on flight tests in addition to requiring the flight profile data to be demonstrated over a range of density altitudes.

In general, flight tests and certifications and particularly, certain Federal Aviation Administration certification flight tests, require or are more easily accomplished, with the availability of highly accurate three-dimensional aircraft positioning and tracking data. In addition, these tests and certifications could greatly benefit from position and velocity feedback to the flight crew. This feedback, in the form of guidance cues could, for example, be used to correct any deviations from the required test flight plan.

Aircraft test programs, such as Federal Aviation Regulation Part 36, Appendix H, "noise certification" could also be greatly enhanced through the use of a highly accurate three-dimensional flight data and guidance system. In this particular certification test program, three precision flight profiles are required: level fly over; approach to landing; and the six degree approach to landing. Historically, the six degree approach to landing has been the most difficult to perform within the regulatory specifications. However, each of these tests requires the flight crew to accomplish difficult flight maneuvers, often with little ground or instrument positioning support.

Another area of flight testing that requires high accuracy three-dimensional aircraft position and velocity data is with instrument flight rules systems certification testing. Federal regulations are currently changing to allow use of global positioning systems navigation equipment to aid in instrument flights. Certification of the equipment that a pilot uses to stay on his assigned precision approach or departure flight path will require a highly accurate and efficient testing system to prove the applicant's product is capable of meeting the Federal Aviation Administration guidelines.

Some of these precision approach test paths are being designed which resemble long funnels having several turns, constantly decreasing in cross sectional area as they near the runway threshold. New regulations have been proposed and are under review to further tighten the existing 'funnels' to accommodate increasing air traffic. As more accurate navigation systems are currently being developed, portable and cost effective flight checking and testing systems of greater accuracy are needed for certification of these navigational aids.

Existing three dimensional positioning and data recording systems capable of custom flight test plans and requirements include laser and encoding optical theodolite systems, grid cameras, as well as microwave trisponder systems integrated with a radar altimeter. These systems are bulky, expensive to operate and are relatively inaccurate.

Another disadvantage of these positioning and data recording systems is that they provide little or no, real-time, three dimensional position feedback or guidance to the flight crew. Any guidance cues available to the flight crew from these systems are relatively inaccurate and tend to induce pilot oscillation due to the low data update rates and high latency times. Thus, current cuing information is typically not useful for positioning and guidance of the aircraft by the flight crew or others on the ground.

Yet another disadvantage of these positioning and data recording systems is their need for a large flight test range area. Additionally, flight test range location choices were limited by system component geometry and line-of-site requirements. Temperamental performance of the equipment due to the ambient environment, including changes in ambient temperature and multipath effects also contributed to rejected data runs. All of these factors combined to create extremely inefficient flight testing activity using these positioning and data recording systems.

Alternative flight evaluation methods using experienced engineering test pilots and aircraft spotters to assist the pilots and confirm whether standards were met have also been employed. These methods are very inefficient, lack accuracy, and raise safety concerns. Additionally, these methods are limited to relatively clear skies and less dynamic maneuvers where the aircraft's flight instruments remain reliable.

More recently, differential global positioning systems have become available for accurately determining object position in three dimensions. These system are based on global positioning systems. Global positioning systems, or GPS, utilize position information signals that are broadcast from a constellation of satellites maintained, at least in part, by the United States government.

The GPS satellites currently broadcast position information signals on two frequencies; L1 (1575.4 MHz) and L2 (1227.6 MHZ). The L1 frequency carrier is currently modulated by two codes, the course acquisition code and the precision code. The L2 frequency carrier is currently modulated with only the precision code. The precision code is encrypted and only available to the military and authorized users. The course acquisition code is available to civilian users of GPS equipment. The accuracy of a course acquisition code GPS receivers is typically lower than that of precision code GPS receivers. Used alone, GPS is of little use in precision flight test applications.

Differential global positioning systems, or DGPS, work by installing one GPS receiver on the position to be analyzed and a second GPS receiver at a control point or reference location. The data from both the desired position and control location receivers are then merged. The resulting DGPS information yields very high position data accuracy in three dimensions. The data merging process can occur real time or in a post processing fashion.

To achieve real time differential global positioning, a first GPS receiver, denoted a reference station is located at the reference location. This reference GPS receiver compares its known location to the currently determined location generated from the latest GPS satellite information broadcast. The reference station develops correction factors that can then be broadcast or otherwise sent to other nearby GPS receivers known as rover(s) that are not at fixed control points. When these correction factors are applied by the rover receivers in a timely fashion, the positional accuracy data in all three dimensions is greatly improved.

Sending or otherwise communication the differential correction from the reference receiver to the rover receivers(s) requires some form of data communication. Since a rover may be moving, radio transmissions may be used. Radio modems that can reliably transmit this type of data should be equipped with forward error correction, an error checking technique. Currently, DGPS receivers capable of accuracy sufficient for flight testing are not available with radio data link modems. The use of radio transmissions also presents a reliability challenge to a system utilizing DGPS reliability.

Although DPGS provides very high positional accuracy, DGPS is currently not yet available for flight requirement and certification testing. Additionally, these systems are not configured to provide the flight or ground crew with needed guidance cues and tracking information. Needed information may include: aircraft position, direction, velocity and acceleration referenced to a selected coordinate system which can be used to correct a flight onto a desired flight path or to confirm the testing. Further, any flight guidance cues must have sufficiently high accuracy, sufficiently low latency and sufficiently high update rates such as to prevent pilot induced oscillation.

For the foregoing reasons, there is a need for an apparatus and method that can provide flight and ground crews with highly accurate aircraft positioning and velocity data as well as providing guidance and tracking information. There is also a need that the apparatus and method be portable, enabling flight testing to take place at a test range that can be established quickly and over most terrains. There is also a need for such a system that is relatively simple to operate and is inexpensive.

SUMMARY

Briefly, and in general terms, the present invention is directed to a portable flight test guidance and tracking system and method for acquiring, processing, archiving, and providing moving aircraft position and velocity data in real time. The present system determines and archives, in three dimensions, the position and velocity data of the aircraft relative to time during a test flight. By utilizing GPS signals transmitted from a GPS satellite constellation, at both a reference location and onboard the aircraft, the present system can provide both flight crews and ground personnel with immediate flight data and guidance cues.

The portable guidance and tracking system of the present invention comprises a ground based GPS antenna and GPS receiver. The GPS antenna is positioned at a first reference location and receives GPS signals transmitted from the GPS satellite constellation. The ground based GPS receiver is electrically connected with the ground based GPS antenna and interprets the GPS signals received at the ground based GPS antenna. The GPS receiver also generates position and correction data for the reference location.

A ground based processor is electrically connected with the ground based GPS receiver and a first communication device is electrically connected with the ground based GPS receiver and the processor. Preferably, the ground based processor is a portable computer having data processing and storage capabilities. Interface equipment, such as a display monitor, a keyboard and a mouse or trackball, are electrically coupled to the processor and provide an interface for use by a ground based crew or flight engineer.

An airborne GPS antenna is attached to the aircraft. This antenna receives GPS signals transmitted from the GPS satellite constellation relative to the moving aircraft. The GPS signals are received and interpreted by an airborne GPS receiver mounted on the aircraft and electrically connected with the airborne GPS antenna The airborne GPS receiver also generates position data for the aircraft. This position data is generated when the aircraft is stationary as well as in flight.

A processor is also mounted to the aircraft and is electrically connected with the airborne GPS receiver. The airborne processor, which is also preferably a computer having data processing and storage capabilities, generally processes and archives the position and velocity data from the airborne GPS receiver in real time.

A second communication device is attached to the aircraft and electrically connected to the airborne GPS receiver and the processor. This second communication device is generally used for transmitting and receiving data with the first communication device. Preferably, both of the first and second communication devices are radio modems capable of sustaining radio modem data link communications during the test flight. A ground based communication antenna and an airborne communication antenna are provided to enhance the communication link.

The first and second communication devices are used to share the position and velocity data, in real time, between the ground based receiver and processor and the airborne receiver and processor. Particularly, aircraft flight data, such as position data and velocity data is transmitted to the ground crew as flight tracking and performance evaluation information. Error correction data is also transferred from the ground based GPS receiver to the airborne GPS receiver. The communication devices may also be used to transfer other flight data as well as guidance cues to a pilot or a flight crew.

Airborne interface equipment, such as a display monitor, a keyboard and a mouse or trackball, are electrically coupled to the airborne processor and provide an interface for use by the pilot or flight crew. In addition, an indicator is mounted within said aircraft for receiving and displaying the flight guidance cues. The indicator is also electrically coupled to the airborne processor.

The present system acquires, processes, archives, and provides precise three dimensional position data and velocity data for the aircraft in real time. Information regarding the aircraft position, direction, velocity, acceleration and any correction needs referenced to a selected coordinate system is immediately presented to the pilot or flight crew on analog as well as digital indicators.

The position and velocity data is updated and evaluated repeatedly by the system and guidance cues are forwarded in real time to avoid pilot induced oscillation during highly dynamic vehicle maneuvers. The guidance cues are provided on the flight indicator or on a plurality of conventional flight instruments. The guidance cues are thus, available for immediate use by the pilot or alternatively, for integration into a vehicle director or an automatic piloting system within the aircraft.

An important aspect of the portable flight guidance and tracking system of the present invention is its very high portability coupled with very low setup time and test range calibration requirements. Both the ground based equipment and the airborne equipment contemplate remote operation and are configure for portability. The ground based equipment may be housed and transported in a vehicle which also supports the airborne equipment until it is placed on the aircraft. This provides for a highly accurate and efficient portable test range that can be quickly setup and calibrated with little regard to topography. In addition, range site survey requirements are minimal allowing a test range to be set-up virtually anywhere and surveyed within a day.

Another important aspect of the present invention is the ability to provide three dimensional (X, Y, Z and ground reference) vector velocity information in a real time manner. A resident guidance program in conjunction with the base and airborne processors can determine and generate guidance cues to keep the aircraft on a complex flight path such as a segmented approach or spiraling approach. The guidance cues are provided in real time and can include both a positioning cue and a power cue. These guidance cues are effective enough to allow for accurate flight testing of a manually controlled aircraft, or can be interfaced into a flight director or autopilot system if available.

By using a pair of GPS receivers, associated processors and radio data communication devices, the present system also provides three dimensional (spacial) position and velocity information in real time to the ground station or ground crew for immediate maneuver evaluation and grading. Aircraft performance testing for evaluating the effects of minor airframe or propulsion system changes is also possible. Use of GPS signals from the GPS satellite constellation allows the system to perform three dimensional position and airspeed calibration at any airspeed or flight altitude.

Yet another important aspect of the present system is the relative low acquisition and operating cost, very high position and velocity accuracy in three dimensions, and information latency low enough combined with update rates high enough to provide effective guidance cues to the flight crew that do not create pilot induced oscillation.

Another important application of the present system is for aircraft noise certification tests as well as aircraft performance measurements. The precision, speed and accuracy of the data produced by the present system allows a test crew to immediately determine whether a specific maneuver or condition has been successfully executed.

The present invention, together with additional features and the advantages thereof, may be better understood by reference to the following description taken in conjunction with the accompanying illustrative drawings.

DESCRIPTION

Figure 1:
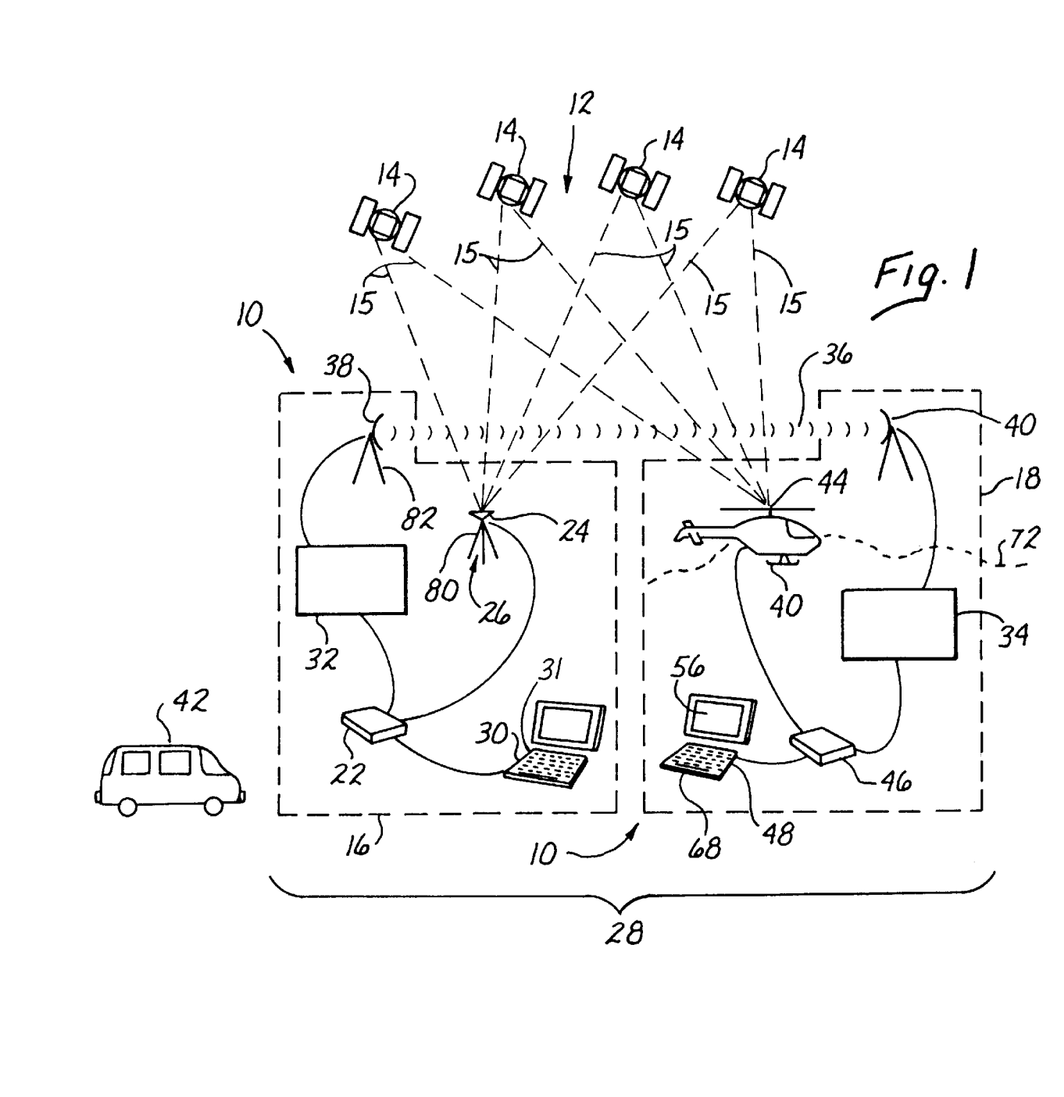
FIG. 1 is a diagrammatic view of an portable guidance and tracking system according to the principles of the present invention shown in conjunction with a global positioning system (GPS), satellite constellation.

Referring now to the figures, wherein like reference characters designate identical or corresponding parts throughout the several views and embodiments, a portable guidance and tracking system according to the present invention is illustrated in FIG. 1 and generally designated by the reference numeral 10.

As shown in FIG. 1, the portable guidance and tracking system 10 incorporates a global positioning system or GPS 12 as is well known. As discussed in the Background section, the GPS 12 includes a GPS satellite constellation 14. This satellite constellation 14 is currently maintained, at least in part, by the United States and broadcasts GPS signal information 15 on two frequencies. An L1 carrier which is currently modulated for public use and an L2 carrier which is currently modulated and also encrypted for military and other authorized use.

The portable guidance and tracking system 10 of the present invention may be configured into sub-systems. Preferably, the portable guidance and testing system 10 (portable system 10) includes a reference or ground based system 16 and an airborne system 18. Although the present disclosure is directed to a portable system 10 for use with the testing of an aircraft 20, it may also be installed as a permanent guidance and tracking system. It should also be understood that the present guidance and tracking system 10 may also be used on ground vehicles as well as ocean going vehicles.

The ground based system 16 includes a GPS receiver 22 and a ground based GPS antenna 24 for receiving the GPS signals 15 transmitted from the GPS satellite constellation 14. The ground based GPS receiver 22 and GPS antenna 24 are electrically connected and preferably electrically connected through a hard wire type connection.

The GPS antenna 24 is located at a first control point or reference location 26. This reference location 26 is typically a familiar reference point such as a flight control tower, other monument or any other selected location. Preferably, the reference location 26 is a fixed reference location within a test flight range 28 and has generally known three dimensional position coordinates.

The ground based GPS receiver 22 interprets the GPS signals 15 received at the ground based GPS antenna 24 and generates position and correction data for the reference location 26.

A ground based processor 30 is electrically connected with the ground based GPS receiver. Preferably, this electrical connection is also a hard wire type configuration. Preferably, the ground based processor 30 is a computer having data processing and storage capabilities. Interface equipment 31, such as a display monitor, a keyboard and a mouse or trackball, may be electrically coupled or integrated into the processor 30 and provide an interface for use by a ground based crew or flight engineer. Preferably, the ground based computer 30 may be a conventional portable notebook style computer, such as a portable notebook computer having a Pentium chip.

A first communication device 32 is electrically connected with both the ground based GPS receiver 22 and the processor 30. This first communication device 32 may be used to transmit and receive data from a second communication device 34 attached to the test aircraft 20. Communication devices 32 and 34 may comprise any type of data communicating devices, such as those using light or radio waves as the data carrier. Preferably, the first and second communication devices 32 and 34 may communicate across a radio frequency modem data link 36 such as a radio frequency modem link created through use of a pair of SNRDS TR 9.6 or 19.2 kbaud radios by G.L.B Electronics.

The radio frequency modem data link 36 preferably operates at a frequency and operating power sufficient to maintain communication throughout a space defined by the test range 28. Radio frequencies using the 900 megahertz spread spectrum may be used, however better range may be obtained using FM radio band frequencies from 450 to 470 megahertz. Preferably, a radio modem having RS-232 control, forward error correction, and transmitter/receiver power of approximately 5 to 50 watts. However, any communication device having similar or enhanced capabilities may be used. Cellular communication such as a cellular phone link may also be used.

A ground based communication antenna 38 and an airborne communication antenna 40 may be provided to enable communication between the first and second communication devices 32 and 34. Preferably these antennas 38 and 40 are each hard wired with their associated communication device 32 and 34. The communication antennas 38 and 40 are selected based on anticipated flight test speeds and the radio frequency transmit and receive patterns required.

In particular, the ground based communication antenna 38 may comprise a radio frequency modem data link antenna such as a pole or mast type antenna. The airborne communication antenna 40 may comprise a radio frequency telephone style antenna, such as a shark fin style antenna which is mounted to the aircraft 20.

The ground based system 16 is preferably portable. A test vehicle 42 may be used to support and house the components of the ground based system 16 as well as to provide a work space for the ground crew. The test vehicle 42 may comprise a modified van. The vehicle 42 may also be equipped with a generator to supply power to the ground based equipment 16. Additional equipment, such as lights and air conditioning or heaters may also be supplied. As previously mentioned, the ground based system 16 may also be permanently installed at a test facility.

The airborne system 18 is configured for installation on the aircraft 20 and may be configured using a test pallet or similar device to support particular components and such that it may be removably installed. The test pallet may be a portable shipping case floated on insulation for vibration isolation. The test pallet may be further provided with conditioned power and cooling air. The test pallet is configured for easy mounting within a convenient location within the test aircraft 20. In one application of the invention, the aircraft 20 being tested is a helicopter such as the MD 900 EXPLORER helicopter manufactured by McDonnell Douglas Helicopter Company, Inc. of Mesa, Ariz. However, any other type of vehicle may be similarly equipped and tested.

The airborne system 16 generally includes an airborne GPS antenna 44 which is electrically connected to an airborne GPS receiver 46 in a similar fashion to the ground based system 16. This GPS antenna 44 also receives GPS signals 15 transmitted from the GPS satellite constellation 14 relative to the moving aircraft 20. The GPS signals 15 are received and interpreted by the airborne GPS receiver 46, also known as a rover, which also generates position data for the aircraft 20. This position data is generated when the aircraft 20 is stationary as well as during a test flight.

Preferably, both the airborne GPS receiver 46 and the ground based GPS receiver 22 are substantially similar and each has differential capability. For example, model RT-20 or RT-2 GPS receivers and systems from NovAtel Company may be used. However, other GPS systems having similar or enhanced GPS (DGPS) capabilities may also be used.

An airborne processor 48 is also mounted to the aircraft 20 and is electrically connected with the airborne GPS receiver 46. The airborne processor 48, is preferably a hardened computer having data processing and storage capabilities and more preferably a portable notebook computer being shock mounted to the aircraft 20. The airborne processor 48 generally processes and archives the position and velocity data from the airborne GPS receiver 46 in real time.

The second communication device 34 is mounted within the aircraft 20 and electrically connected to the airborne GPS receiver 46 and the processor 48. As discussed, this second communication device 34 is generally used for transmitting and receiving data with the first communication device 32 and utilizes an airborne communication antenna 40 to enhance the communication link 36.

In particular, the first and second communication devices 32 and 34 are used to share the position and velocity data relative to time and in real time, between the ground based GPS receiver and processor 22 and 30 and the airborne GPS receiver 46 and processor 48. Particularly, aircraft flight data, such as position data and velocity data relative to time is transmitted to the ground crew as flight tracking and performance evaluation information. Error correction data is also transferred from the ground based GPS receiver to the airborne GPS receiver in real time. Thus the portable guidance and tracking system 10 utilizes a differential global positioning system.

Figure 2:
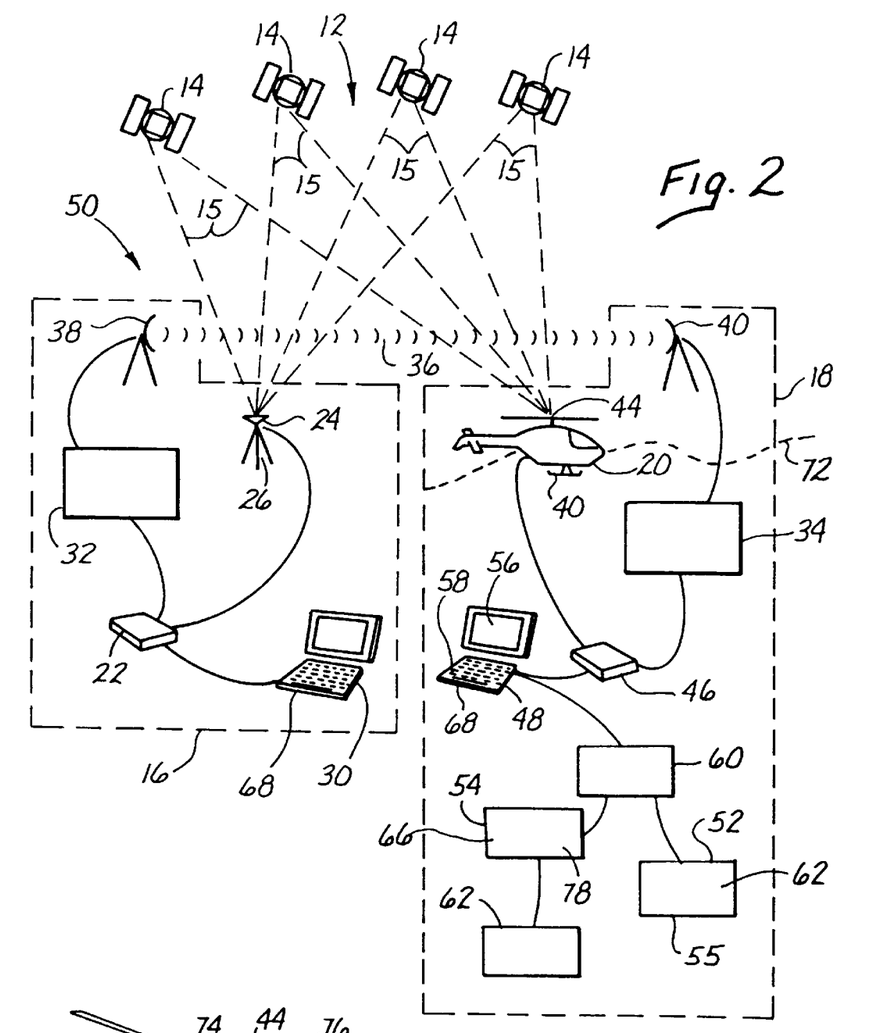
FIG. 2 is a diagrammatic view of the portable system of FIG. 1 shown incorporating guidance components according to the present invention.

Referring now to FIG. 2, an alternative embodiment of a portable guidance and tracking system 50 according to the principles of the present invention is shown. In this embodiment, the portable system 50 is similar to the previously described embodiment, as shown in FIG. 1, and may include all of the previously described components. These component are identified using the same reference numerals used in the previous embodiment and will generally not be redescribed.

In this embodiment, the portable guidance and tracking system 50 is configured for determining and archiving, in real time, position and velocity data for the test aircraft 20 relative to time. In addition to the airborne processor 48, a plurality of conventional flight instruments 52 may be provided within the aircraft. Preferably, these instruments 52 are existing instruments, but may also be incorporated into the aircraft 20 as a cockpit interface. This cockpit interface is configured to provide real-time guidance cues to a pilot or flight crew as well as for programming and de-bugging interfacing efficiency. A monitor 54 is mounted in the cockpit to provide ease of readability by the flight crew. Preferably, the monitor 54 has a sunlight readable display. This monitor 54 may be in addition to a monitor 56 provided with the airborne processor 48. A keyboard 58 and mouse or trackball type apparatus 59 may also be provided as part of the airborne processor 48 and used by the flight crew to simplify interfacing and improve communication between the airborne and ground based systems 16 and 18.

The airborne processor 48 may be provided with an output card 60. Preferably the output card 60 may be an analog output card, such as an AT-A06-10 by National Instruments, which installs directly into the airborne processor 48. The output card 60 may be used to drive at least one of the instruments 52 such as an analog indicator 55. Alternatively, a digital output card 60 may be used and a digital indicator 55 may also be used.

The output card 60 and the plurality of conventional instruments 52 may be used to provide the guidance cues 62 to the aircraft 20. These guidance cues 62 may include a power component which is used by a pilot of flight crew to adjust the test aircraft velocity and a position component. The position guidance cues may be used by the pilot or flight crew to adjust the direction of the aircraft 20. Both the power and the position guidance cues should be provided in real time, having a sufficiently low latency and high update rate so as to prevent pilot induced flight oscillations. In an alternative embodiment of the invention, the guidance cues 62 may be sent to an automatic piloting system 64 instead of or in addition to generating flight guidance cues.

Figure 3:
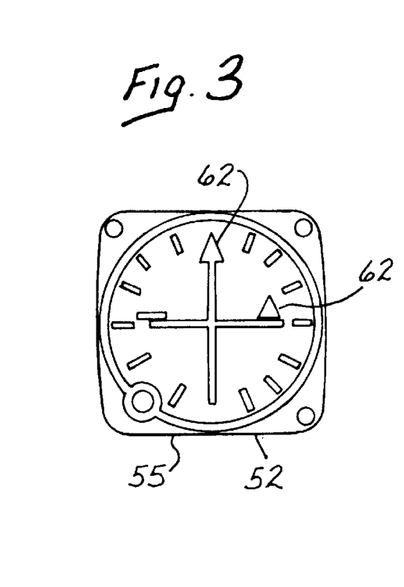
FIG. 3 is a front view of an indicator used to provide guidance cues according to an embodiment of the present invention.

Turning now to FIG. 3, a typical indicator 55 is shown. The indicator 55 may be used to provide flight data and the flight guidance cues 62 to the flight crew in addition to any guidance cues 62 given through the monitor 54 and other instruments 52. In a preferred embodiment, a plurality of indicators 55 may be provided and include a course deviation indicator and a glideslope deviation indicator.

In a preferred embodiment for the described helicopter 20, the indicator 55 preferably has a needle sensitivity of 10 meters from centered to full scale on the glideslope deviation indicator, and 15 meters from needle centered to full scale deviation on the course deviation indicator. This scaling may be adjusted to meet varying pilots needs as well as different air qualities. The scaling may also be changed as technologies and instruments improve. Other indicators or devices capable of interfacing with the airborne processor 48 and having the ability to provide the pilot or flight crew with position and velocity instructions may also be used.

Figure 4A:
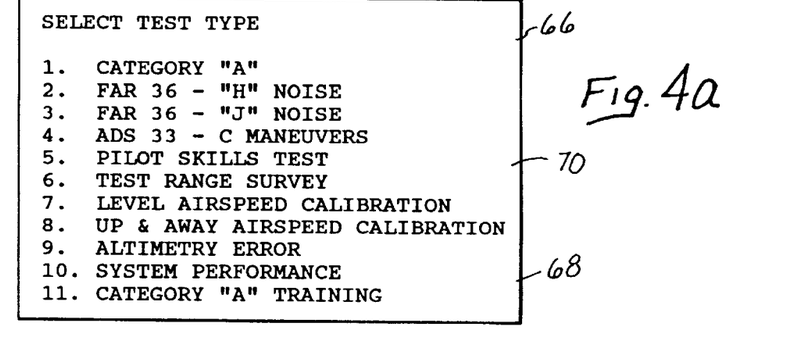
FIGS. 4a–4o is a diagrammatic flow-type chart of the resident processing and operations software showing system menu screens.
Figure 4B:
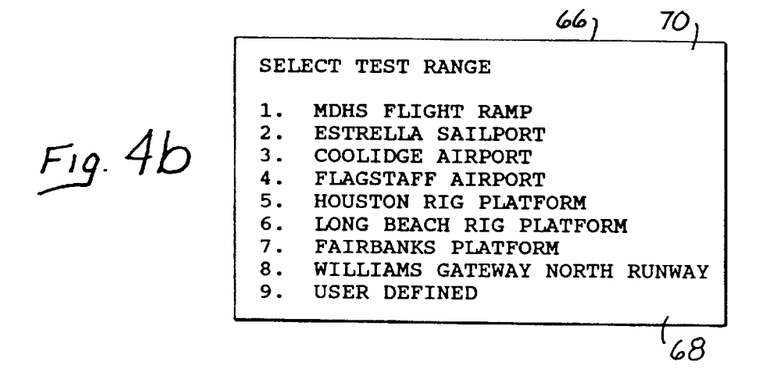
Figure 4C:
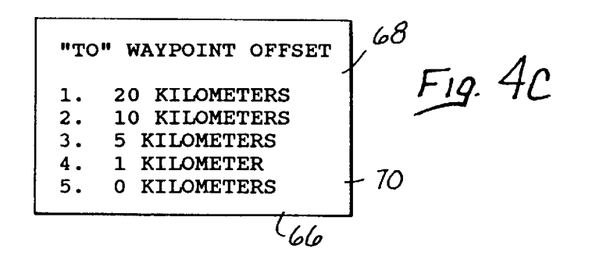
Figure 4D:
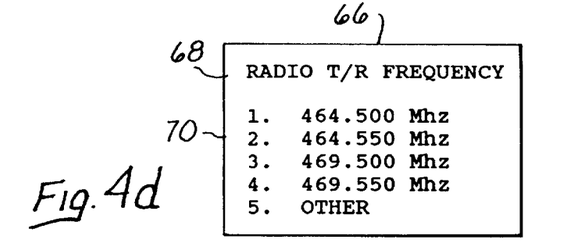
Figures 4E, 4F:
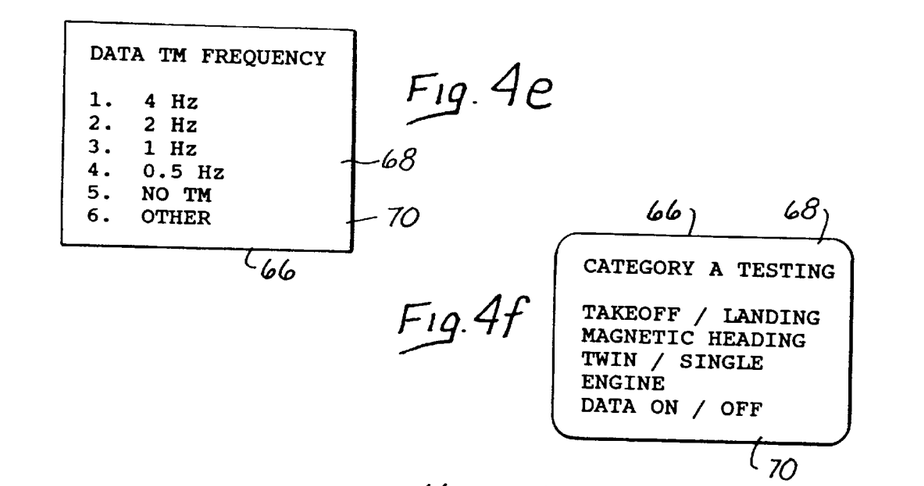
Figure 4G:
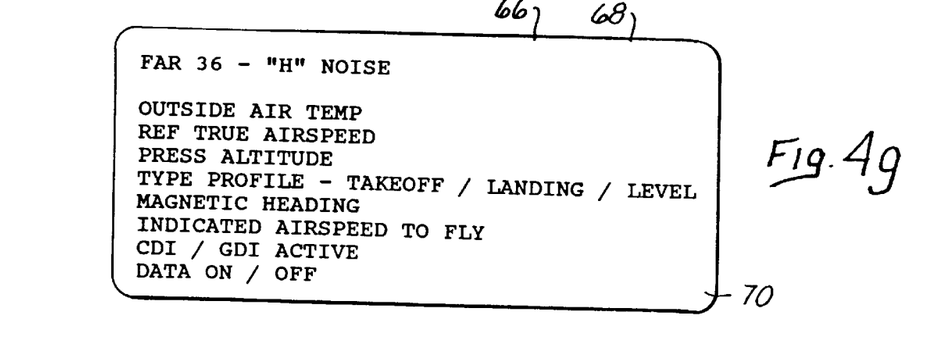
Figures 4H, 4I:
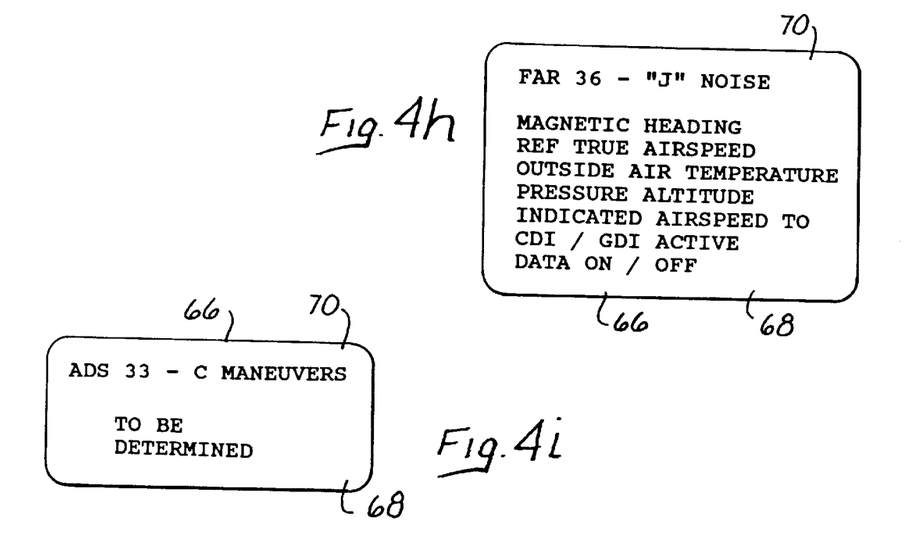
Figure 4J:
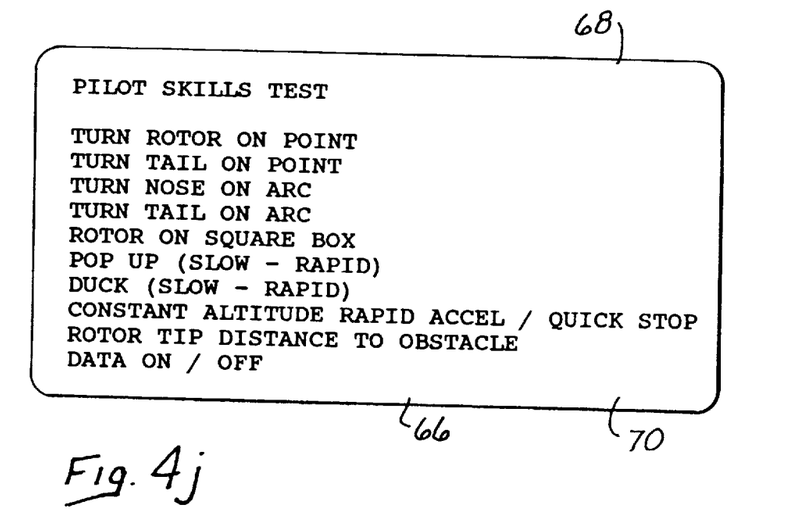
Figure 4K:
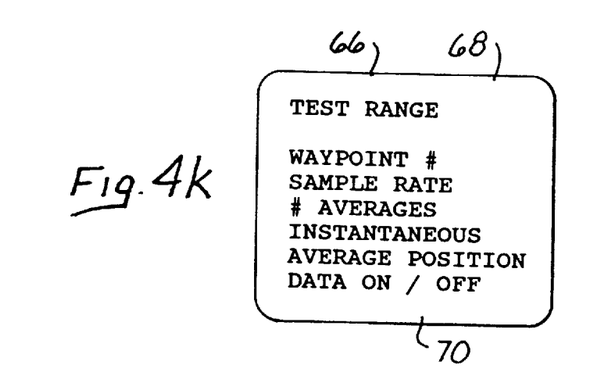
Figure 4L:
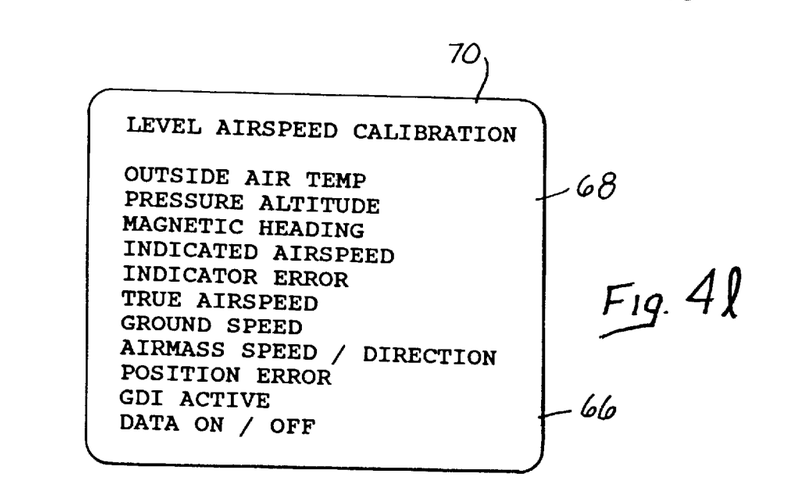
Figure 4M:
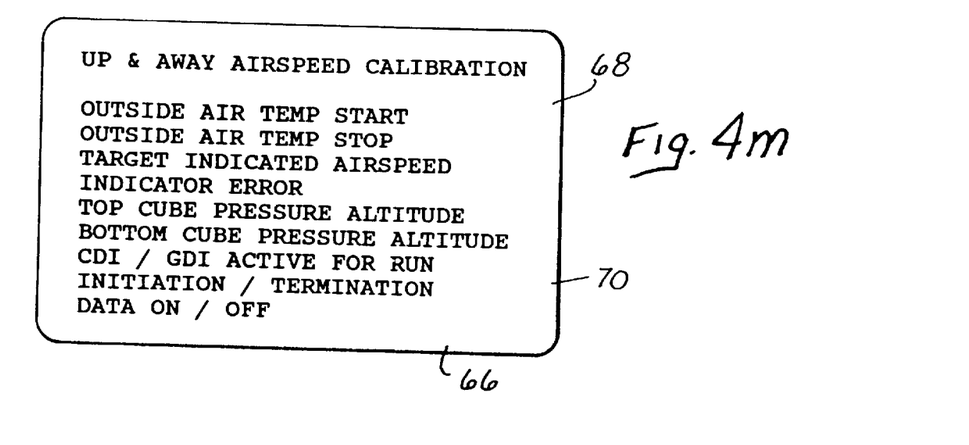
Figure 4N:
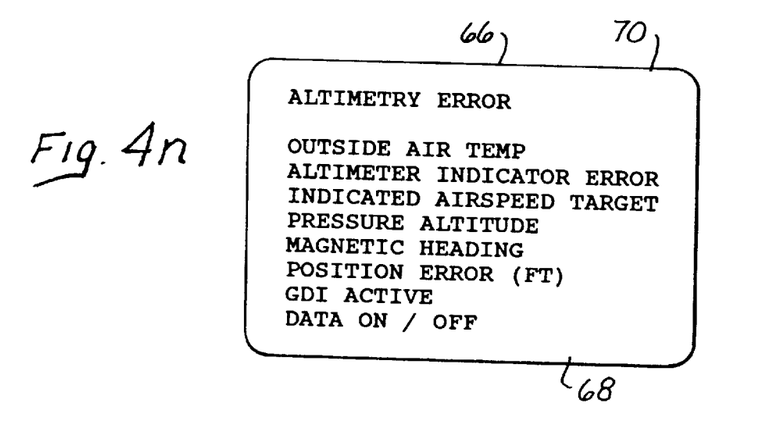
Figure 4O:
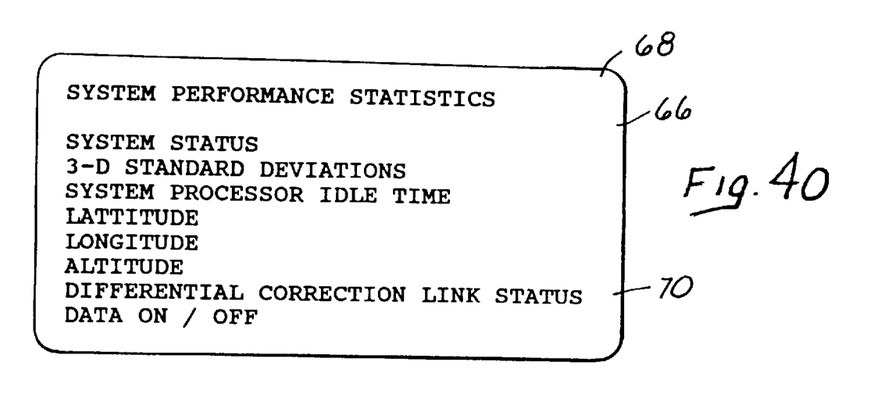

Referring now to FIGS. 4a through 4o, an embodiment of a flow chart of screen displays from an embodiment of a resident system processing and operations program 68 used in conjunction with the ground based and airborne processors 30 and 48 is generally shown. As shown, the resident program 68 may include a plurality of selector screens 66, each having a menu 70 for selection by the ground based or airborne crew.

The resident system program 68, in conjunction with the processors 30 and 48, provides means for acquiring, processing, and archiving the flight data relative to time and in real time. In a preferred embodiment of the invention, the resident system program 68 is written in a graphical programming environment, such as Labview for Windows by National Instruments Company, Inc. The program 68 provides the flight crew as well as the ground crew command and control authority for data archiving and flight profile selection. Other similar programs and programming environments may also be used. The screens 66, as illustrated in FIGS. 4a–4o, may be displayed on the monitor 54, the monitor 56 attached to the processor 48 and even a monitor 31 attached to the ground based processor 30.

The resident program 68 may include a subroutine that compares a current and actual position and velocity of the aircraft 20 against a desired position and velocity relative to time and computes the difference. The desired aircraft position and velocity may be a predetermined position and velocity as defined by a predetermined test flight profile 72. This information may be directed to the flight crew, an autopilot system, and to the ground crew.

As illustrated, each screen display 66 of the resident program 68 may incorporate a menu 70, having a plurality of selectable options. This allows the flight crew to select a database file containing waypoint coordinates and other information appropriate to the flight profile 72 and test range 28 environment. The program 68 creates data files for storage of ASCII and Binary files of relevant data, such as data required by FAA software certification requirements. The program 68 may also be used to establish communications with the second communication device 34 and the airborne GPS receiver 46, and issues commands to the airborne GPS receiver, forcing transparent messages to be broadcast that may be received by the ground system 16. The program 68 may also issues waypoint navigation commands to the airborne GPS receiver 46 based on the database read into the program 68 upon initialization. Commands are then sent to the airborne GPS receiver 46 to log binary data logs back to the processor 48. In a preferred embodiment, standard binary data logs, such as those distributed by NovAtel include velocity, waypoint navigation, and latitude/longitude/msl height. These data logs may be continuously sent from the airborne GPS receiver 46 to the airborne processor 48.

The resident program 68 may also allow the flight crew can turn on and off a data archiving feature, which automatically communicates an ASCII formatted subset of the aircraft processor 48 archived data to the ground system 16 through the communication devices 32 and 34. The flight crew is able to monitor a display on the monitor 54 that confirms that data is communicated to the ground system 16. Other menu 70 options available to the flight crew may include normalizing the displayed aircraft altitude to a specific location in the test range environment, as well as other choices depending on the type test being performed.

Preferably, the resident program 68 converts the binary data logs generated by the GPS receivers 24 and 46 into ASCII structure and then communicate this information out to the processors 30 and 48 for used during the flight test and for archiving. Time data may also be converted to Coordinated Universal Time (UTC).

As mentioned, the resident program 68 may include a data archiving feature for storing relevant data parameters. Because each of the processors 30 and 48 operating systems may store this information in a buffer memory and archive it when the operating system gets around to it, a special file flushing function is implemented to force the data to be written to an electronic or magnetic storage device, such as a hard disk, on a continual basis. This flushing function also tags the data file with an end-of-file marker. In the event the computer crashes from an operating system anomaly or a power failure, the data will be recoverable (should the computer crash without an end-of-file marker present in the data file, the data file is at extreme risk of not being recoverable). While data is being archived on the aircraft 20, it may also be transmitted to the ground based system 16 through the first and second communication devices 32 and 34.

The resident program 68 may also include a subroutine for creating a data file upon initialization that archives the processor 48 date and time, and then archives a regurgitation of the input database file. When the flight test is completed, the flight crew may activate an automatic shutdown procedure for the airborne system 18. The resident program 68 instructs the second communication device 34 to cease broadcast of the data logs and to return to a reset condition, which clears out the GPS buffer memory. The data file mentioned in this paragraph is used as documentation that all aircraft position and velocity information collected between the initialization and closure of this data file was obtained using a specific set of waypoint coordinates as well as other relevant data.

Figure 5:
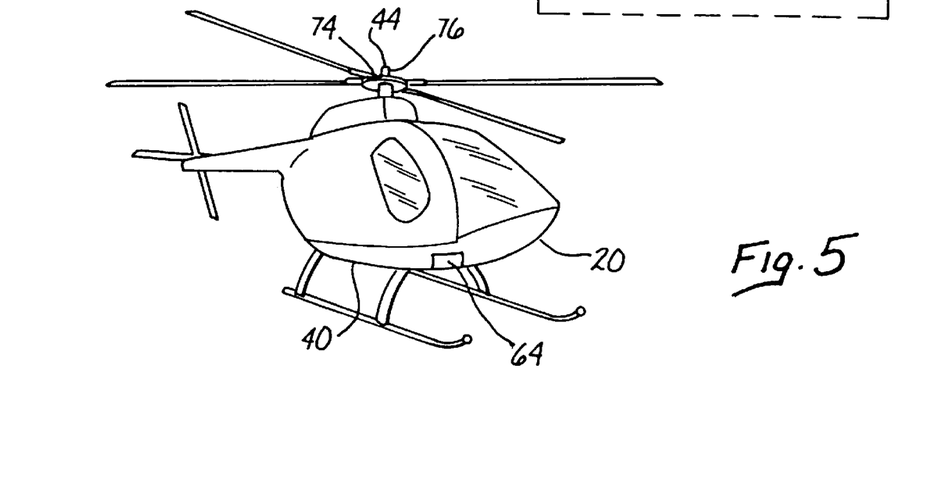
FIG. 5 is a perspective view of a test vehicle configures with a GPS antenna and a communication antenna as used in the present invention.

Referring now to FIG. 5, a perspective view of the test aircraft 20 equipped with the airborne system 18 is shown. In the embodiment shown, the aircraft 20 is a helicopter. The airborne GPS antenna 44 may be mounted at the top center of the main rotor hub 74. A stand pipe 76 may be used to facilitate the use of this location. However, the airborne GPS antenna 44 can be mounted at any practical location on the test aircraft 20 that allows GPS signal 15 reception from the GPS satellite constellation 14. For example, a tail boom location may also be used on a helicopter such as the one illustrated. The airborne communication antenna 44 may be mounted to the underside of the test aircraft 20. This communication antenna 44 may also be mounted to any practical location on the test aircraft 20.

Referring now to FIGS. 1 through 5, an embodiment of a flight test using as an aircraft such as the helicopter shown in FIG. 5 will be generally described. The airborne system 18 may be installed in the test aircraft 20 as generally described. In particular, the monitor 54 may be mounted on the aircraft instrument panel and directly in front of the flight crew. Preferably, the monitor 54 includes a sunlight readable flat panel color display 78. The mouse, track pad or similar device 58 may be removably secured to the aircraft instrument panel (typically) and in reach of the flight crew.

A power/reboot control panel may also be installed in the instrument panel within reach and view of the pilot and flight crew. A circuit breaker or power switches may be provided to control power to the AC devices and to enable hard reboot of the airborne system 18. A plurality of high intensity light emitting diodes (LED's) may be provided to indicate the operational status of each device.

The GPS receiving antenna 44 is installed at the most optimally available point on the upper side of the aircraft 20. Preferably, this location has the best view of the horizon without aircraft structure blockage. On a helicopter, this is typically either at the top center of the rotor hub 74 (may require a standpipe with appropriate adaptor), or on a bracket attached to the tail boom of the aircraft 20. Power may be applied to the airborne system 18 and proper functioning of all components verified.

Installation of the ground based system 16 is relatively similar to that for the airborne system 18. As previously discussed, the ground based system 16 is preferably maintained, at least partially, in a portable vehicle 42.

The ground based system 16 is assembled and powered. Power may be any local power supply and may even include a battery system. A generator may also be provided to operate the ground based system 16. A pair of radios may be provided, one to monitor the test frequency of the radio data link 36, and the other to monitor the common traffic advisory frequency (or tower frequency).

The GPS antenna 24 should be installed at an elevated position, such as on a tripod 80. This installation should be as far as possible from all potential radio frequency reflecting surfaces that might induce multi path or other disturbances on the GPS signal 15.

The ground based communication antenna 38 should also be installed at a relatively elevated position, such as a tripod 82. The ground based communication antenna 38 should be installed at least a few feet away from the ground based GPS antenna 24 and preferably in an area that provides constant line-of-sight to the test aircraft 20, whether on the ground or in flight. However, this is not required. As previously discussed, the ground based GPS antenna 24 is located at the reference location 26 which preferably has generally known coordinates.

Once the ground and airborne based systems 16 and 18 are installed, the entire portable guidance and tracking system 10 should be powered up and the ground based GPS receiver 16 should be allowed to establish a valid position for the reference location 26.

The resident program 68, which is preferably installed within the storage or memory of each of the ground based and the airborne processors 30 and 48, may next be initialized. A system operator, such as a member of the ground crew or the flight crew may provide the resident program 68 with a best position estimate of the ground based GPS antenna 24. For example, the height may be estimated by referencing a topographical map or local airport data. The ground based GPS receiver 22 should be commanded to report the latitude and longitude position for the ground based antenna 24 and reference location 26 positions.

When working in a local coordinate system, it may adequate to record any latitude-longitude combination after the GPS receiver 22 is indicating a valid position and the height has been fixed. In order to establish higher accuracy position data, new latitude and longitude positions should be averaged with the established position. If this approach is taken, then the height should not be fixed but should be allowed to be processed along with the lateral positions.

To establish a test range 28, the reference location 26 should be chosen within the selected test range 28. The test range 28 should include the space over which the test flight will occur. Other points relative to the reference location 26 may then be surveyed using the portable system 10. This information yields a local coordinate system that does not have to be referenced to any absolute Earth fixed system. This technique allows for maximum test range 28 portability and is adequate if there is no necessity to relate the aircraft flight data to any absolute coordinate system.

If reference to an absolute coordinate system is desired, this may be easily accomplished by selecting a reference location 26 located at a known position in three dimensional space relative to the absolute system. For many flight certification tests, such as flight testing activities under Federal Aviation Regulations Part 36 or Part 29, a locally established coordinate systems is satisfactory.

As discussed above, the portable guidance and tracking system 10 of the present invention is not generally sensitive to ground topography so the test range 28 may be chosen with little regard to topography. However, it is critical that both the reference or ground based GPS receiver 22 and the airborne GPS receiver 46 receive an adequate number GPS signals 15 from the same GPS satellites 14 to achieve good three dimensional accuracy. This restriction places some limitations on the distance and topography between the reference location 26 and the airborne GPS receiver 46 or aircraft 20.

For flight tests applications having a test path baselines) longer that approximately ten kilometers, or for those requiring extreme real-time accuracy, dual frequency differential global positioning systems should be used. Thus, the ground based GPS antenna and receiver 24 and 22 and the airborne antenna and receiver 44 and 46 may be configured to utilize GPS signals 15 broadcast over both the L1 and L2 frequencies from the GPS satellite constellation 14. As an additional advantage, these dual frequency receivers are capable of virtually eliminating ionospheric propagation errors which are a major source of errors with current DPGS.

A method of determining and archiving, in real time and in three dimensions, position, velocity and acceleration data relative to time for the aircraft 20 during a test flight and according to the principles of the present invention generally comprises providing a portable flight guidance and tracking system 10 having a ground based or reference system 16 and an airborne system 18. A test range 28 is also preferably provided.

The base system 16 generally includes a base GPS receiver 22 which is electrically connected with a base GPS antenna 24 for receiving and interpreting GPS signals 15 transmitted from a GPS satellite constellation 14. The base GPS receiver 22 is also electrically connected with a base processor 30 and a first radio communication device 32. The base processor 30 is also electrically connected with the first radio communication device 32.

The airborne system 18 generally includes an airborne GPS receiver 46 which is electrically connected with an airborne GPS antenna 44 for receiving and interpreting GPS signals 15 transmitted from the GPS satellite constellation. Preferably, both of the Base and airborne GPS antennas and receivers (24, 22, 44, 46) are configured for DPGS.

The airborne GPS receiver 46 is electrically connected with an airborne processor 48, and both the GPS receiver 46 and the processor 48 are electrically connected with a second radio communication device 34. The second radio communication device 34 is configured transmitting and receiving data with said first communicating device 32.

A test flight plan or profile 72 is then determined. Preferably the test flight profile includes a predetermined position and velocity profile for the test aircraft 22. However, this is not required.

A reference location 26 is the identified within the test range 28. Position data, in three dimensions is then acquired for the reference location 26 using the base system 16. Position data may then be acquired for the test aircraft 20, in real time, using the airborne system 18. The method includes the step of updating the three dimensional position data for the aircraft 20 during the flight test using the airborne system 18.

The first communication device 32 and the second communication device 34 may be activated such that they communicate. This communicating step transfers the three dimensional position data for the aircraft 20 relative to time and the reference location 26 between the airborne system 18 and the base system 16. The three dimensional position data for the aircraft 20 and the reference location 26 may then be processed using the base and airborne processors 30 and 48. This data may be used to determine static and dynamic position data, velocity data and acceleration data for the aircraft 20 relative to the reference location 26. The processed flight data may then be archived to an electronic storage medium within at least one of the base and airborne processors 30 and 48 and preferably both.

In addition to the above steps, a method according to the principles of the present invention may include the step of evaluating the position and velocity of the aircraft 20, in real time, relative to the test flight plan or profile 72. As previously discussed, this test flight profile 72 may include a predetermined position and a velocity for the aircraft 20 at a plurality of points throughout the test flight.

Guidance cues 62 may then be determined, in real time, for correcting any deviations between the position and velocity of the aircraft 20 relative to the predetermined position and velocity profile of the test flight profile 72. The guidance cues 62 may then be communicated and provided to the aircraft 20 and particularly, the pilot or flight crew, to enable correction of the position and velocity of the aircraft to that of the test flight profile 72 during the test flight.

Figure 6:
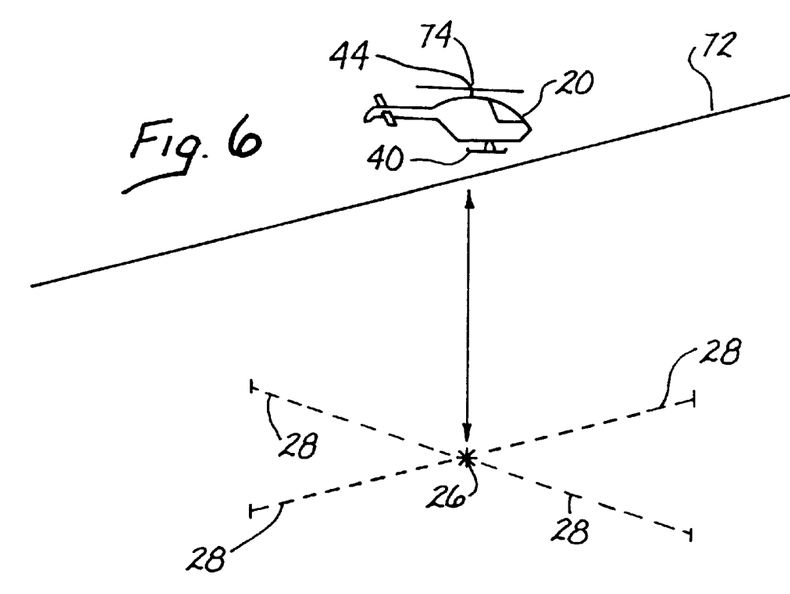
FIG. 6 is a diagram of a level fly over flight test profile and an approach-to-landing flight test profile.

FIG. 6 is a diagram of a level fly over test flight profile and an approach-to-landing test profile for an aircraft 20 being tested using an embodiment of the present invention.

As described, once the test range 28 is established, the GPS (DGPS) of the portable system 10 is initialized. This is preferably done before the test flight. For fixed wing aircraft, where landing may not be possible, system initialization can be achieved by having the aircraft 20 loiter within the communication range of the radio modem data link 36 for sufficient time to allow initialization to occur. To reduce time required for system 10 initialization, multi frequency GPS may be used. This will eliminate the delay incurred using only the L1 frequency while awaiting the highest accuracy operating mode of the differential GPS.

The portable system 10 may also be initialized while not in direct line of site with the reference or ground based GPS antenna 24. This may be accomplished by using an additional ground based radio modem (not shown). If this second ground based modem is located within the flight test launch or takeoff location such that the portable system 10 can be initialized with the aircraft 20 parked on the launch location. Also, if a telephone hard-line exists at the launch location, the differential correction data logs from the ground based GPS receiver 22 may be electrically coupled to both the first communication device 32, as well as a telephone modem. Another telephone modem can be coupled in series with the second communication device 34 to complete the data link 36 with the test aircraft 20. Radio coverage must be maintained so that the test aircraft 20 will maintain the data link 36 to either the first communication device 32 or the test range modem, so that as the aircraft 20 climbs in altitude after takeoff, the first communication device 32 becomes receivable. Once this situation has occurred, the telephone modem link at the test range 28 can be deactivated.

In some locations, ground based system correction logs may be available by subscribing to a commercial service. This service currently utilizes the sideband of a commercial FM radio station carrier wave to broadcast the differential correction logs for one or more manufacturer's GPS (DGPS) equipment. To effectively use this service for precision flight testing, arrangements must be made to broadcast the differential corrections from the test range 28 over a telephone modem to an FM radio station that has coverage at the launch airport. The flight crew on board the test aircraft 20 must then use a special FM modem as the source for the differential correction data until the aircraft 20 has launched and is within radio modem range of the test range 28. At this point, the flight crew has the option of shifting from the FM broadcast differential corrections to those being transmitted between the first and second communication devices 32 and 34. This is especially true if concerns of continued reception of the FM source are warranted.

The differential correction data should all come from the same ground based system 16 for the DGPS portion of the portable system 10 to remain in the initialized mode. Furthermore, interruption of the differential correction signal reception must be minimized to prevent the resetting of the DGPS to the autonomous mode and the need to restart system initialization.

Another option, depending upon the capability of the first and second communication devices 32 and 34, is to bridge the line-of-site gap between the ground based communication antenna 38 and the launch location of the aircraft 20 using a digipeater. This is simply another simplex or duplex radio transmitter/receiver that will listen for the differential correction logs broadcast from the ground based system 16, and then immediately re-broadcast those correction data logs once the ground based communication device 32 is silent. Digipeaters can be installed in series to accommodate difficult challenges in line-of-site maintenance caused by high terrain or urban structures.

Figure 7:
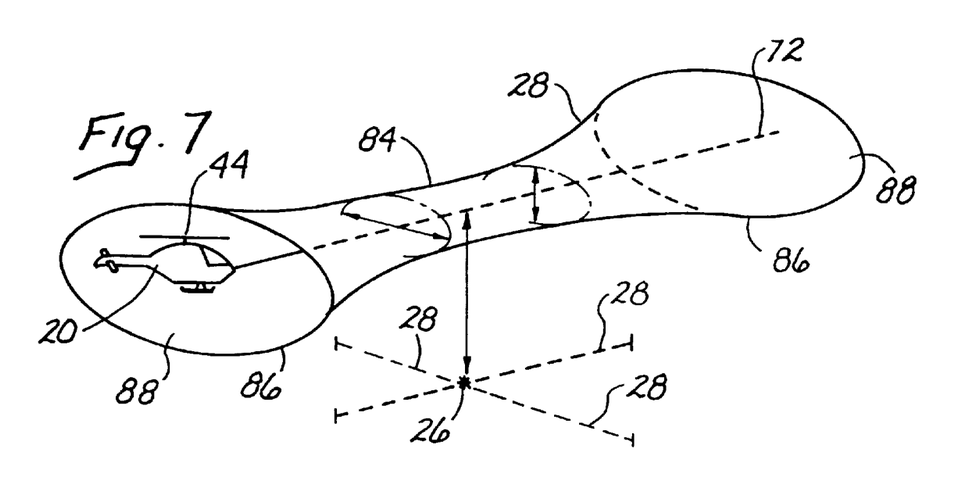
FIG. 7 is a diagram of a test flight profile showing a pair of funnels created by the resident program in conjunction with the system processors and degraded sensitivity of the flight indicator.

Referring now to FIG. 7, a flight test profile 72 in the shape of a flattened tube 84 is shown. A subroutine may be incorporated into the resident program 68 and the airborne processor 48 which degrades at least one indicator 55 sensitivity outside a predetermined window 86. For example, a degradation of plus or minus 1,500 meters within a defined point in space. This change creates a funnel 88 at each end of the precision test flight profile 72 which is already flat tube shaped 84.

This subroutine, which may be a subroutine of the archiving and control routine described above, creates a set of equations or lookup tables. These tables relate planned aircraft positions and velocities to specific points on the ground. As the aircraft 20 is navigated over the flight test profile 72, such as the flight profiles identified and illustrated in FIG. 4b, and which have a predetermined position and velocity profile, the true GPS reported position of the aircraft 20 (relative to the input waypoints) is compared to the preprogrammed position tables or equations (flight profile 72 data). Correction values are then generated based on the comparison of actual data and the flight profile 72. Preferably, these correction values are relative to time and may be provided to the pilot or flight crew as guidance cues 62. The correction values may scaled, such as by a sensitivity control device made available to the flight crew. Digital correction values may be converted to analog values using a digital to analog conversion card installed in the airborne processor 48. The resulting voltage values may be used to drive the indicators 55 installed in view of the pilot and as described.

The flight crew can also monitor the digital values on the control monitor 54 or even the computer monitor 56, and can adjust the sensitivity of the indicators 55 (guidance needles), in real time, to suit the needs of the pilot. Two or more indicators 55 may also be used, such as a course deviation indicator CDI and a glideslope deviation indicator GDI. However, other indicators or devices may be used which allow roll and pitch control and power control of the aircraft 20 to be directed to the pilot. The resident program 68 allows the portable system to provide guidance cues 62 from simple level flight to complex multi-segmented landing approaches or takeoff profiles and allows the flight crew the ability to select any sort of predetermined flight profile 72 in real-time.

Referring now, back to FIG. 7, the funnels 88 illustrate the areas where the sensitivity of at least one of the indicators 55 has been degraded. The degraded sensitivity of the indicator 55, combined with some knowledge of ground references, course headings and the guidance cues 62, allows for the pilot to easily stabilize the aircraft 20 while on the test flight profile 72. The gradual change from a degraded indicator 55 (needle sensitivity) also allows the pilot to "tune up" for each precision flight segment. Other indicators, either analog or digital, such as altimeters, flight angle instruments and speed indicators may also be used.

Uses for the portable flight guidance and tracking system 10 of the present invention include aircraft testing and evaluations. For example, aircraft handling qualities evaluations to Aeronautical Design Standard 33D. Also Federal Aviation Administration category A certification for helicopters, FAR Part 36-H noise certification for helicopters, and a large variety of certification flight testing for fixed wing aircraft. Any dynamic vehicle testing requiring precise vehicle position or that coupled with flight piloting cues to maintain a course in three dimensions can make use of this system. Weapons system testing, navigation system or communication system testing are just a few examples of testing requirements that can be achieved more effectively and efficiently through the use of the present invention.

Grading of flight maneuvers during flight testing and certifications is most efficiently accomplished immediately upon completion of the flight maneuver. The present invention will be able to allow a real-time data link over the simplex radio modems that can then broadcast critical flight grading information to a test director's location. Both vertical (side view) progress and horizontal (look down view) progress plots may be generated as the flight progresses, as well as a ground speed plot. The plots will be in a local coordinate system that can demonstrate the aircraft position relative to important ground reference points, such as test microphones or runway thresholds.

The portable system 10 of present invention can easily be time synched to the aircraft on-board instrumentation inter-range instrumentation group time. With time synched data packages, data output can be formatted to provide flight manual descriptive profile charts.

During the development of an aircraft and its instrumentation systems, determination of the useable cue environment may be delayed until quite late in the aircraft's test program. Integration of symbology and other aids is typically not completed when the control law development and handling qualities are being determined. The portable system 10 of the present invention can be utilized to drive simple cockpit instrumentation which simulate the systems proposed for the advanced aircraft. This can also aid the flight crew in performing flight tasks and simulating more advanced systems to assist in determining the useable guidance cue environment proposed but not yet developed.

Although several embodiments of the invention have been described, it is to be understood the invention is not to be limited to those descriptions. Various changes and alterations may be made to the design and arrangement of the individual components or to the supporting software without departing from the spirit and scope of the invention as understood by one with skill in the art.

What is claimed:

1. A portable system for flight testing an aircraft, said portable flight test system operable in conjunction with GPS signals broadcast from a GPS satellite constellation for determining and archiving, in real time, position and velocity data of the aircraft during a test flight, said portable system comprising:
- a ground based GPS antenna for receiving GPS signals transmitted from the GPS satellite constellation, said ground based GPS antenna positioned at a first reference location;
- a ground based GPS receiver electrically connected with the ground based GPS antenna for receiving and interpreting GPS signals from the ground based GPS antenna and for generating position and correction data for the reference location;
- a ground based processor electrically connected with the ground based GPS receiver;
- a first communication device electrically connected with each of said ground based GPS receiver and processor;
- a portable airborne system for attachment to said aircraft, said airborne system including:
  - (a) an airborne GPS antenna attached to said aircraft for receiving GPS signals broadcast from the GPS;
  - (b) an airborne GPS receiver electrically connected with the airborne GPS antenna for receiving and interpreting GPS signals from the airborne GPS antenna and for generating position data for the aircraft;
  - (c) a second communication device electrically connected with said airborne GPS receiver, said second communication device for transmitting and receiving data with said first communication device; and
  - (d) an airborne processor electrically connected with the airborne GPS receiver and the second communication device, said airborne processor for processing and archiving the position data from the airborne GPS receiver to determine position and velocity data, in real time, for the aircraft; and
- wherein said ground based GPS receiver and processor and said airborne GPS receiver and processor communicate electronically through the first and the second communication devices to determine differences between an actual aircraft position and velocity profile and the predetermined position and velocity profile of the test flight plan.

2. The portable system as recited in claim 1 wherein said airborne system is removably attached to said aircraft.

3. The portable system as recited in claim 1, and further comprising a support vehicle for supporting said ground based GPS receiver, said ground based processor and said first communication device.

4. The portable system as recited in claim 1 wherein said ground based processor is a portable computer.

5. The portable system as recited in claim 1 wherein said ground based GPS receiver and said airborne GPS receiver are substantially similar.

6. The portable system as recited in claim 1 wherein each of said first and second communication devices comprise a cellular communication device.

7. The portable system as recited in claim 1 wherein said first and second communication devices comprise a radio frequency modem data link.

8. The portable system as recited in claim 1 wherein said airborne GPS receiver is adapted to receive and process differential correction data from the ground based GPS receiver and said differential correction data is transmitted through the first communication device to the second communication device.

9. The portable system as recited in claim 1 wherein each of the ground based GPS receiver and the airborne GPS receiver has the ability to acquire, process and utilize signals transmitted from the GPS over both an L1 frequency and an L2 frequency.

10. A portable guidance and tracking system for determining and archiving, in real time, position and velocity data of an aircraft during a test flight and for providing a plurality of flight guidance cues to the aircraft relative to a test flight plan, said portable guidance and tracking system comprising:
- a ground based GPS antenna for receiving GPS signals transmitted from a GPS satellite constellation, said ground based GPS antenna positioned at a first reference location;
- a ground based GPS receiver electrically connected with the ground based GPS antenna for receiving and interpreting GPS signals from the ground based GPS antenna and for generating position and correction data for the reference location;
- a ground based processor electrically connected with the ground based GPS receiver;
- a first communication device electrically connected with each of said ground based GPS receiver and processor;
- an airborne GPS antenna attached to said aircraft for receiving GPS signals transmitted from the GPS satellite constellation;
- an airborne GPS receiver electrically connected with the airborne GPS antenna and attached to the aircraft, said airborne GPS receiver for receiving and interpreting GPS signals from the airborne GPS antenna and for generating position data for the aircraft;
- a second communication device attached to the aircraft, said second communication device for transmitting and receiving data with said first communication device;
- an airborne processor electrically connected with the airborne GPS receiver and the second communication device, said airborne processor for processing and archiving the position data from the airborne GPS receiver and the position and correction data from the ground based GPS receiver to determine and archive position data and velocity data, in real time, for the aircraft; and
- an indicator mounted within said aircraft for receiving and displaying said plurality of flight guidance cues; and
- wherein the ground based GPS receiver and processor and the airborne GPS receiver and processor communicate electronically through the first and the second communication devices.

11. The portable system as recited in claim 10 wherein at least some of the plurality of flight guidance cues comprise both a position guidance cue and a power guidance cue and said indicator is adapted to indicate both of said position and said power guidance cues.

12. The portable system as recited in claim 11 wherein the indicator comprises a display monitor mounted within the aircraft for displaying the guidance cues.

13. The portable system as recited in claim 11 wherein the indicator comprises a plurality of conventional flight instruments.

14. The portable system as recited in claim 13, wherein said plurality of conventional flight instruments includes a course deviation indicator and a glideslope deviation indicator.

15. The portable system as recited in claim 10 wherein the aircraft comprises an automatic piloting system and wherein the airborne computer is electrically connected with the automatic piloting system such that the plurality of guidance cues are directed to the automatic piloting system for use in piloting the aircraft.

16. The portable system as recited in claim 10 wherein said airborne processor generates a plurality of digital correction values and provides said values to said indicator.

17. The portable system as recited in claim 10 wherein said first communication device is electrically connected to a ground based communication antenna and said second communication device is electrically interconnected to an airborne communication antenna mounted to said aircraft.

18. The portable system as recited in claim 10 wherein said flight plan comprises a predetermined position and velocity profile and one of the ground base processor and the airborne processor generates the plurality of flight guidance cues from the differences between an actual aircraft position and velocity profile and the predetermined position and velocity profile of the test flight plan.

19. A method of determining and archiving, in real time and in three dimensions, position, velocity and acceleration data relative to time for an aircraft during a test flight, said method comprising the steps:

provinding a portable test range comprising:
(a) a base system having a base GPS receiver electrically connected with a base GPS antenna for receiving and interpreting GPS signals transmitted from a GPS satellite constellation, said base GPS receiver electrically connected with a base computer and each of said base GPS receiver and said base computer electrically connected with a first radio communication device;
(b) an airborne system having an airborne GPS receiver electrically connected with an airborne GPS antenna for receiving and interpreting GPS signals transmitted from the GPS, said airborne GPS receiver electrically connected with an airborne computer and each of said airborne GPS receiver and said airborne computer electrically connected with a second radio communication device for transmitting and receiving with said first communicating device; and
(c) a test range for supporting the base system;

determining a test flight plan having a predetermined position and velocity profile for the aircraft;

identifying a reference location within the test range;

acquiring three dimensional position data for the reference location using the base system;

acquiring three dimensional position data in real time for the aircraft using the airborne system;

updating the three dimensional position data for the aircraft during the aircraft test flight using the airborne system;

communicating between the first communication device and the second communication device for transferring the three dimensional position data for the aircraft and the reference location between the airborne system and the base system;

processing the three dimensional position data for the aircraft and the reference location using the base and airborne computers to determine static and dynamic aircraft position data, velocity data and acceleration data relative to the reference location; and archiving the processed data to an electronic storage medium within at least one of the base and airborne computers.

20. The method as recited in claim 19, and further comprising the step of:

evaluating the aircraft position and velocity in real time relative to the test flight plan;

determining a real time guidance cue for correcting any deviations between the position and velocity of the aircraft relative to the predetermined position and velocity profile of the flight plan; and providing the real time guidance cue to the aircraft to enable a flight controller to correct the position and velocity of the aircraft during the test flight.

21. The method as recited in claim 20 wherein the step of providing the real time guidance cue comprises using a plurality of directing instruments within the aircraft to direct the flight controller.

22. The method as recited in claim 21 wherein the step of providing the guidance cue comprises providing the guidance cue to an automatic piloting system on the aircraft.

23. The method as recited in claim 20, and further comprising the step of communicating the guidance cues from the base system to the airborne system using the first and second communication devices.

* * * * *

UNITED STATES PATENT AND TRADEMARK OFFICE
CERTIFICATE OF CORRECTION

PATENT NO. : 6,005,513
DATED : April 25, 2000
INVENTOR(S) : Ronald A. Katz, Gary L. West, Thomas B. Barker It is certified that error appears in the above-identified patent and that said Letters Patent is hereby corrected as shown below:

Figures,
Fig. 1, numeral 14, please change "telemarketeer's" to -- telemarketer's --.
Fig. 5, numeral 198, please change "calender" to -- calendar --.
Fig. 7, numeral 230, please change "contract" to -- contact --.

Column 8,
Line 53, after "transaction" delete the comma "," and insert therefor a semi-colon -- ; --.
Line 56, after "customer" delete the comma "," and insert therefor a semi-colon -- ; --.
Line 57, after "determination" delete the comma "," and insert therefor a semi-colon -- ; --.
Line 61, after "customer" delete the comma "," and insert therefor a semi-colon -- ; --.

Column 41,
Line 6, after "displaying a" insert -- screen pop of information --.

Signed and Sealed this

Thirteenth Day of November, 2001

Attest:

NICHOLAS P. GODICI
Attesting Officer   Acting Director of the United States Patent and Trademark Office